US 7,673,159 B2

(12) United States Patent
Aoyagi et al.

(10) Patent No.: US 7,673,159 B2
(45) Date of Patent: Mar. 2, 2010

(54) DEVICE STATE CONTROL METHOD AND INFORMATION PROCESSING APPARATUS

(75) Inventors: Tatsuya Aoyagi, Tachikawa (JP); Hideyuki Umezu, Oume (JP); Hironori Motoe, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 487 days.

(21) Appl. No.: 11/300,415

(22) Filed: Dec. 15, 2005

(65) Prior Publication Data

US 2006/0187708 A1   Aug. 24, 2006

(30) Foreign Application Priority Data

Dec. 17, 2004   (JP) .............................. 2004-366876

(51) Int. Cl.
*G06F 1/26*   (2006.01)
(52) U.S. Cl. ...................................... 713/310; 713/300
(58) Field of Classification Search ................ 713/300, 713/330, 310
See application file for complete search history.

(56) References Cited

U.S. PATENT DOCUMENTS

| 5,867,506 A | * | 2/1999 | Lin | 714/718 |
| 2003/0009614 A1 | * | 1/2003 | Fujii et al. | 710/306 |
| 2004/0044817 A1 | * | 3/2004 | Thurlo et al. | 710/305 |

FOREIGN PATENT DOCUMENTS

JP   2003-330576   11/2003

* cited by examiner

*Primary Examiner*—Tse Chen
(74) *Attorney, Agent, or Firm*—Pillsbury Winthrop Shaw Pittman, LLP

(57) ABSTRACT

A device state control method for use in an information processing apparatus that has a body, a device connectable to the body, a storage portion which stores information of a state of power supply to the device, the device state control method including: determining whether the information of state of power supply stored in the storage portion is information of power-supply OFF state or not, after instructing to shift the state of the power supply to the device from the power-supply OFF state into a power-supply ON state; and starting the power supply to the device, when the information of power-supply OFF state is stored in the storage portion.

21 Claims, 5 Drawing Sheets

DEVICE STATE CONTROL METHOD AND INFORMATION PROCESSING APPARATUS

CROSS-REFERENCE TO RELATED APPLICATIONS

This application is based upon and claims the benefit of priority from the prior Japanese Patent Application No. 2004-366876, filed on Dec. 17, 2004; the entire contents of which are incorporated herein by reference.

BACKGROUND

1. Field

The present invention relates to a device state control method which controls the state of a device, and more particularly to a device state control for a device for which power supply is at a stop.

2. Description of the Related Art

In recent years, there has been developed a computer to which devices, for example, an optical disk drive and a hard disk drive, are connectable. With the development of such a computer, development has also been made on the control of power supply to the device which is connected to the computer.

There has heretofore been a personal computer which is capable of distinguishing the sort of an extended bay to be attached into a bay slot and then supplying correspondent voltage power (refer to JP-A-2003-330576 (page 14, FIG. 29)).

BRIEF SUMMARY

In a case where a user is to use the extended bay, he/she must supply the voltage power to the extended bay as disclosed in JP-A-2003-330576.

On the other hand, in a case where the user is to detach the device connected to the computer, he/she needs to perform, for example, a process for stopping the power supply to the device, by employing, for example, an operating system included in the computer.

In a case where the user is to start the power supply to the device, after having stopped the power supply to the device, he/she requires the troublesome manipulation of, for example, physically detaching the device from the computer and physically connecting the device to the computer again.

The present invention provides an information processing apparatus in which a device in an unusable state can be shifted into a usable state by performing a simple manipulation, and a device state control method which shifts an unusable device into a usable state.

DETAILED DESCRIPTION

Figure 1:
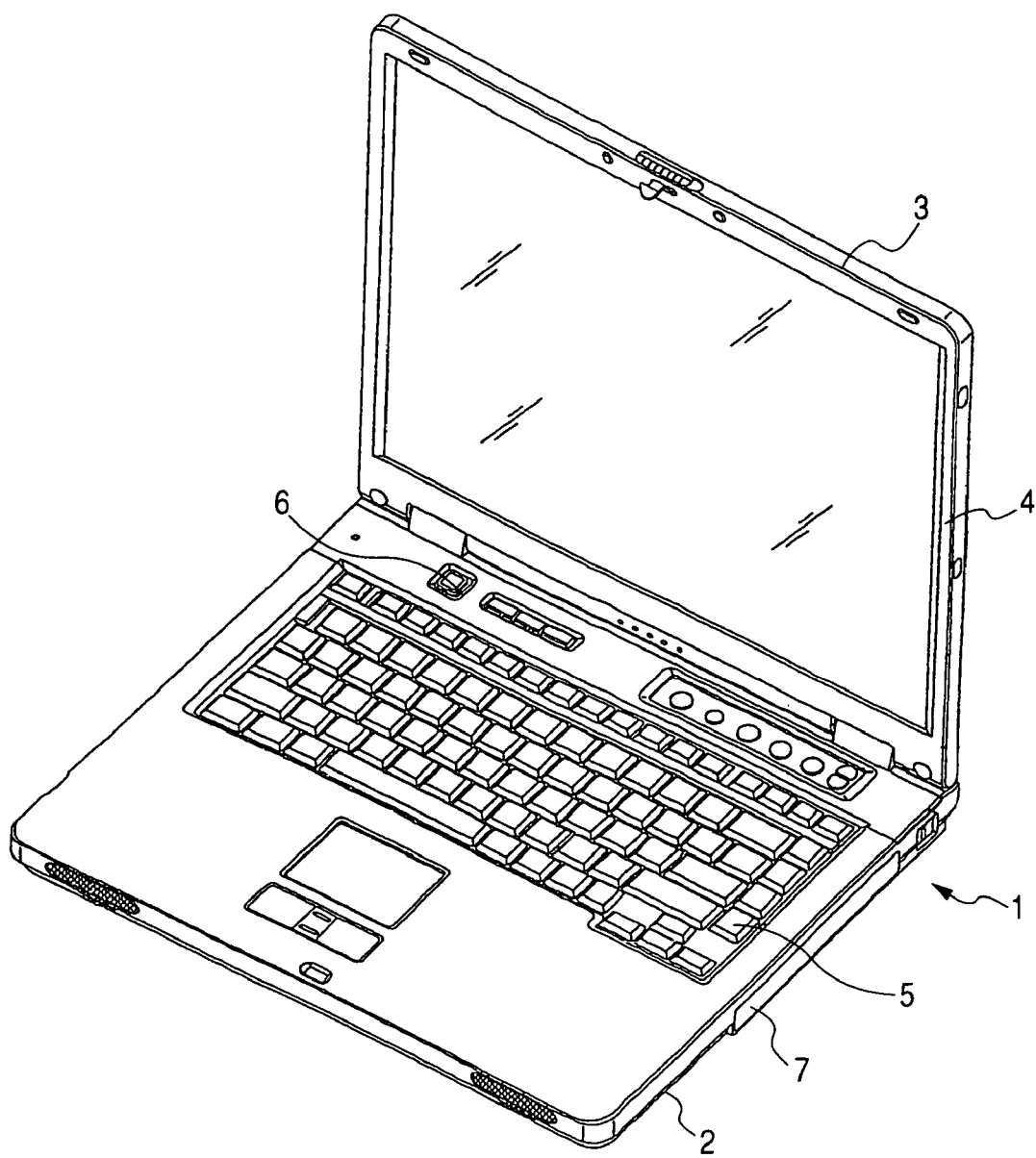
FIG. 1 is a view showing a state where a display unit is opened relative to a body.

FIG. 1 is a view showing a state where a display unit 3 of a notebook type personal computer (hereinbelow, termed "computer") 1 is opened relative to a body 2 thereof.

The computer 1 is constituted by the body 2 and the display unit 3. A display device including an LCD (Liquid Crystal Display) 4 is incorporated in the display unit 3, and the LCD 4 is located substantially centrally of the display unit 3.

The display unit 3 is mounted on the body 2 so as to be turnable between an open position and a closed position. The body 2 has a substantially boxlike shape, and a keyboard unit 5, a power button 6 for turning ON/OFF the power source of the computer 1, etc. are arranged on the upper surface of the body 2. In starting the use of the computer 1, the power button 6 is manipulated to be depressed.

A select bay slot 7 is provided in the side surface of the body 2. Devices which conform to the select bay slot 7, can be detachably connected to this select bay slot 7. The devices conforming to the select bay slot 7 include such sorts of devices as an ODD (Optional Disk Drive), an HDD (Hard Disk Drive) and a TV tuner.

Figure 2:
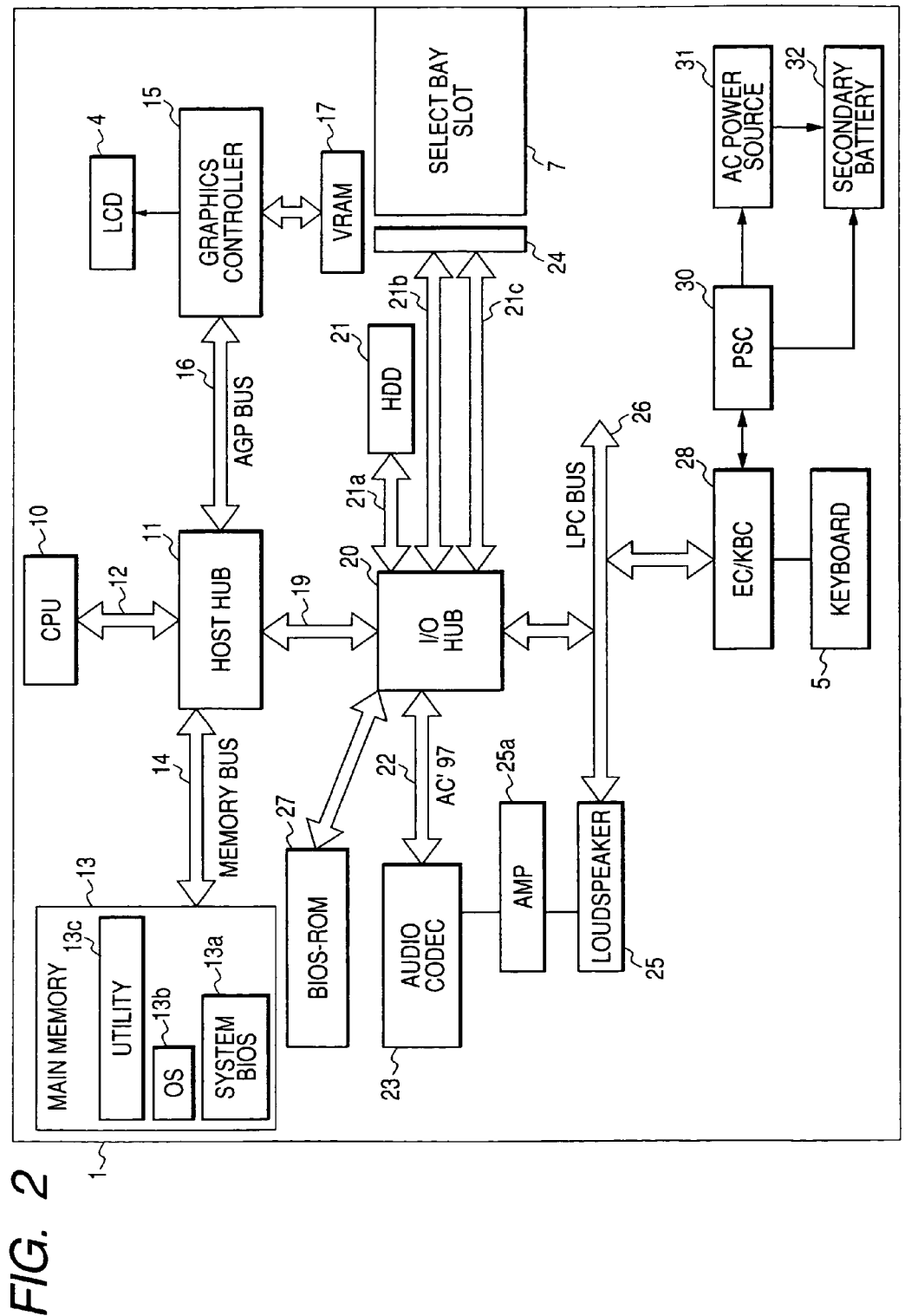
FIG. 2 is a diagram for explaining an example of the hardware configuration of a computer.

Next, the hardware configuration of the computer 1 will be described with reference to FIG. 2.

A CPU 10, a main memory 13, a graphics controller 15 and an I/O hub 20 are connected to a host hub (first bridge circuit) 11.

The host hub 11 is connected with the CPU 10 through a system bus 12. This host hub 11 has a built-in memory controller which controls access to the main memory 13.

The CPU 10 is a main processor which controls the operation of the computer 1. This CPU 10 runs an operating system (OS) 13b, application programs and utility programs 13c which are loaded from a hard disk drive (HDD) 21 being an external storage device, into the main memory 13 through a memory bus 14. Besides, the CPU 10 runs a System BIOS (Basic Input Output System) 13a which is loaded from a BIOS-ROM 27 into the main memory 13.

The graphics controller 15 which is connected to the host hub 11 through an AGP (Accelerated Graphics Port) bus 16, outputs a digital display signal to the LCD 4. A video memory (VRAM) 17 is connected to the graphics controller 15, and this graphics controller 15 displays on the LCD 4, data drawn in the video memory 17 by the OS/application program.

The host hub 11, and the I/O hub (second bridge circuit) 20 which is connected by a dedicated bus, for example, a hub interface, control various devices on an LPC (low pin count) bus 26.

The I/O hub 20 is connected with the HDD 21 being the external storage device and supporting the serial ATA standard, through a bus 21a supporting the serial ATA standard. Further, the I/O hub 20 is connected with an extended connector 24 through a bus 21b supporting the IDE standard, a bus 21c supporting the USB standard, etc.

The extended connector 24 is configured so as to be connectable with various connectors which are disposed in the devices that are attached into the select bay slot 7 and that conform to the select bay standard.

The HDD 21 stores therein the operating system (OS), the application programs, the utility programs, and data which a user has created using the application programs.

An audio codec 23 is connected with the I/O hub 20 through an AC (Audio Codec) bus 97 (22). The audio codec 23 is a sort of sound inputting/outputting codec. This audio codec 23 includes codec portions for inputted sound and for sound to-be-outputted.

An amplifier (AMP) 25a is connected to the audio codec 23. The AMP 25a amplifies a sound signal generated by the audio codec 23. The sound signal amplified by the AMP 25a is delivered to a loudspeaker 25, and the loudspeaker 25 outputs a sound wave of audio frequency band.

An embedded controller/keyboard controller IC (EC/KBC) 28 is connected on the LPC bus 26.

The embedded controller/keyboard controller IC (EC/KBC) 28 is a single-chip microcomputer in which an embedded controller for performing power management, etc., and a keyboard controller for controlling the keyboard (KB) unit 5 are integrated.

The keyboard 5, the power button 6 and a PSC (Power Supply Controller) 30 are connected to the EC/KBC 28. Further, an AC adaptor 31 and a secondary battery 32 are connected to the PSC 30.

When the user manipulates the power button 6, the EC/KBC 28 detects the manipulation of the power button 6. Upon detecting the manipulation of the power button 6, the EC/KBC 28 notifies the PSC 30 to start power supply to the system of the computer 1 by way of example. The PSC 30 performs a control on the basis of the notification received from the EC/KBC 28, so as to start the power supply from the AC adaptor 31 or the secondary battery 32 to the system of the computer 1. Next, examples of controls relevant to the I/O hub 20 and the EC/KBC 28 will be described.

Figure 3:
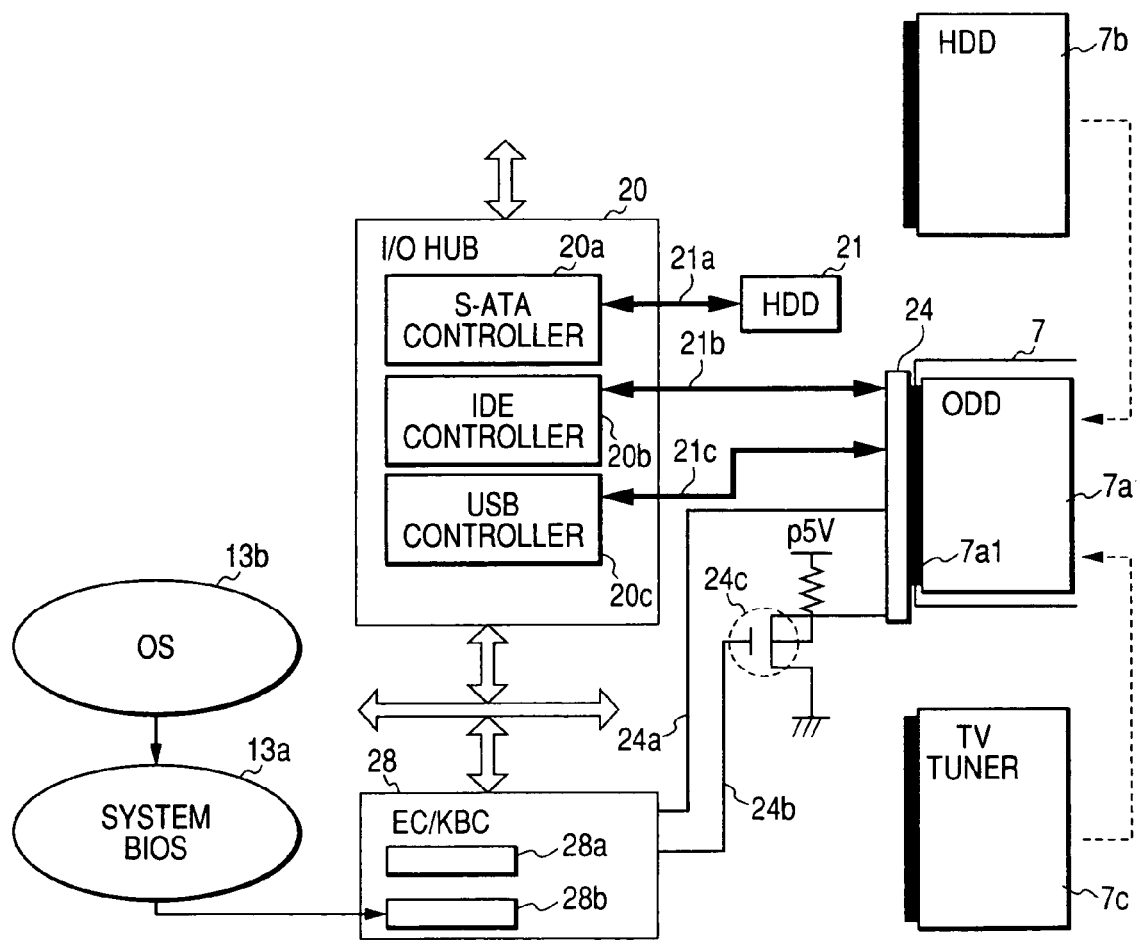
FIG. 3 is a block diagram for explaining examples of controls relevant to an I/O hub and an EC/KBC.

FIG. 3 is a block diagram for explaining the examples of the controls relevant to the I/O hub 20 and the EC/KBC 28.

A serial ATA (S-ATA) controller 20a for controlling the serial ATA bus 21a, an IDE controller 20b for controlling the IDE bus 21b, and a USB controller 20c for controlling the USB bus 21c are built in the I/O hub 20.

The EC/KBC 28 includes a register 28a for storing the sort of the device attached into the select bay slot 7, and a register 28b for storing the state of power supply to the device attached into the select bay slot 7.

When an ODD 7a conforming to the select bay standard is attached into the select bay slot 7, the extended connector 24 and a connector 7a1 disposed in the ODD 7a conforming to the select bay standard are connected. When the connectors 24 and 7a1 are connected, the EC/KBC 28 reads the voltage value of a signal line 24a, thereby to recognize that the device attached into the select bay slot 7 is the ODD 7a.

Likewise, when an HDD 7b conforming to the select bay standard is attached into the select bay slot 7, the extended connector 24 and a connector 7b1 disposed in the HDD 7b conforming to the select bay standard are connected. When the connectors 24 and 7b1 are connected, the EC/KBC 28 reads the voltage value of the signal line 24a, thereby to recognize that the device attached into the select bay slot 7 is the HDD 7b.

After the EC/KBC 28 has recognized the device attached into the select bay slot 7, it writes the sort of the recognized device into the register 28a.

Here, let's consider a case where, in a state in which a power source voltage is supplied to the device attached into the select bay slot 7, the user performs a manipulation for detaching the device attached into the select bay slot 7, by using the OS 13b.

When the user has performed the manipulation for detaching the device attached into the select bay slot 7, by using the OS 13b, this OS 13b notifies the System BIOS 13a to the effect of "detaching the device attached into the select bay slot 7". Upon receiving the notification, the System BIOS 13a controls the bus connected with the device attached into the select bay slot 7, so as to bring the controller disposed within the I/O hub 20, into a disabled state.

Further, the System BIOS 13a notifies the EC/KBC 28 to "detach the device". Upon receiving the notification, the EC/KBC 28 delivers a signal for controlling a switch 24c from an "ON" state into an "OFF" state, through a signal line 24b. Then, the power supply to the device attached into the select bay slot 7 is stopped. Besides, the EC/KBC 28 writes into the register 28b, the fact that the power source voltage is not supplied to the device attached into the select bay slot 7. Next, there will be described a method by which the state of the power supply to the device attached into the select bay slot 7 is turned from a power-supply OFF state into a power-supply ON state.

Figure 4:
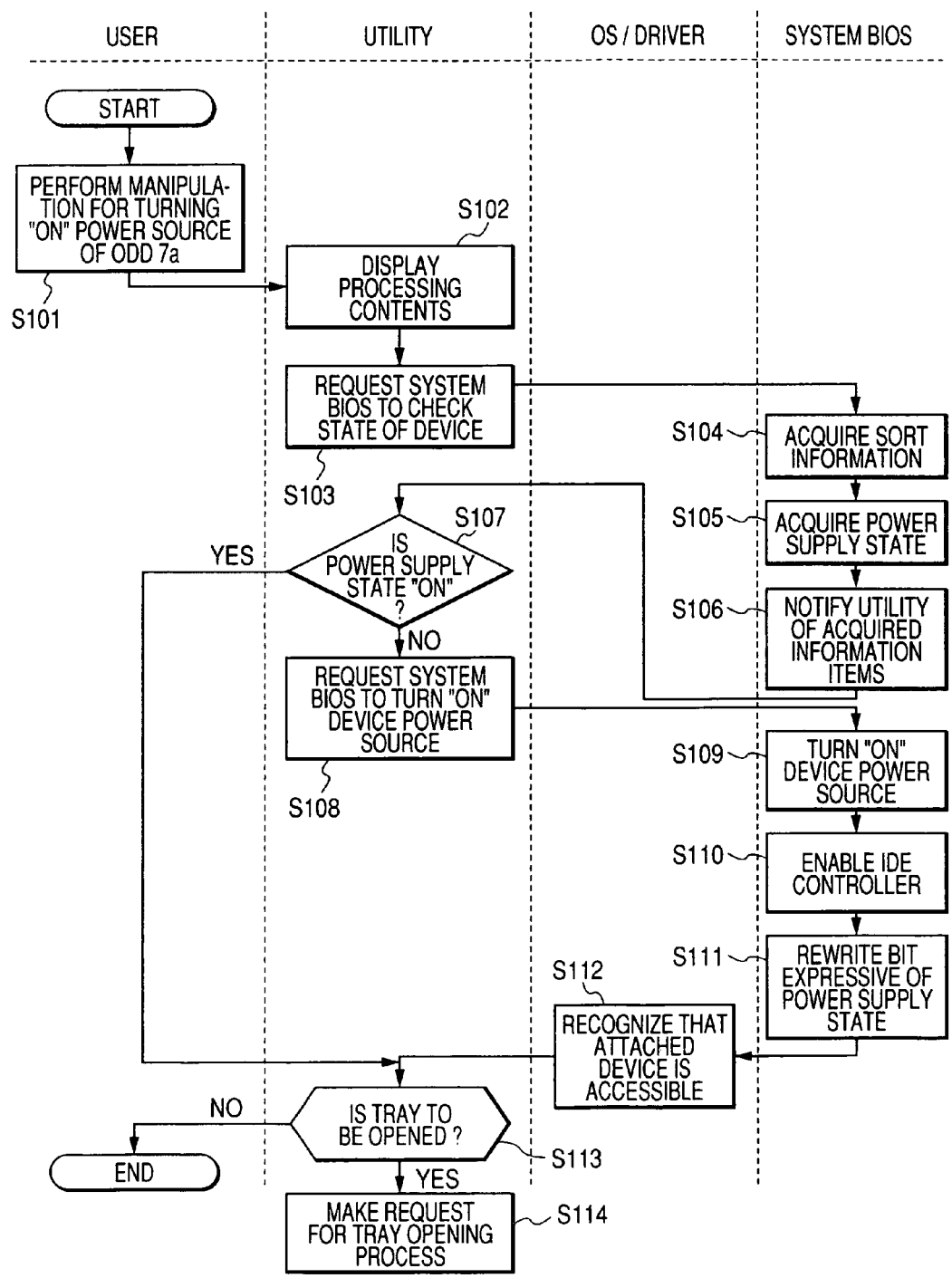
FIG. 4 is a flow chart for explaining an example of a control flow by which the state of power supply to a device attached into a select bay slot is turned from a power-supply OFF state into a power-supply ON state.

FIG. 4 is a flow chart for explaining an example of a control flow by which the state of the power supply to the device attached into the select bay slot 7 is turned from the power-supply OFF state into the power-supply ON state. Here, the case will be explained where the ODD 7a is attached into the select bay slot 7.

The user manipulates, for example, a specified key among a group of keys constituting the keyboard 5, in order that the power supply state of the ODD 7a may be turned from the power-supply OFF state into the power-supply ON state (step S101).

Figure 5:
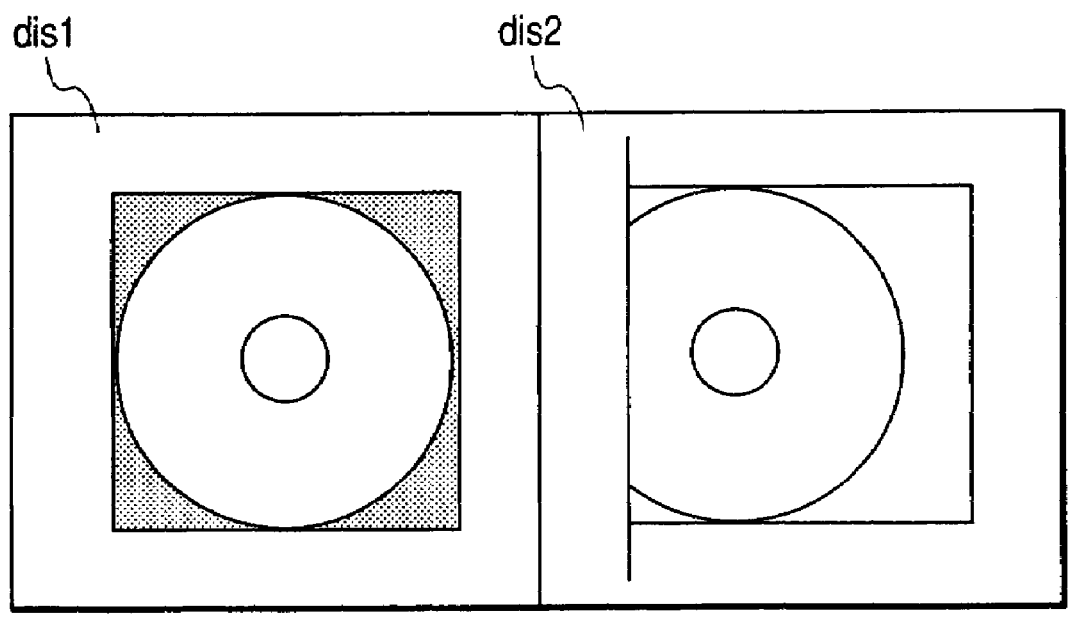
FIG. 5 is a view for explaining an example of a screen which shows ODD power-source turn-ON instructions.

Then, a screen shown in FIG. 5 is displayed on the LCD 4 (step S102). In a case where the user wants to shift the power supply state of the ODD 7a from the power-supply OFF state into the power-supply ON state, he/she selects a display "dis1". On the other hand, in a case where the user wants to shift the power supply state of the ODD 7a from the power-supply OFF state into the power-supply ON state and to thereafter open the tray of the ODD 7a, he/she selects a display "dis2".

When the user has selected either of the displays "dis1" and "dis2", the utility 13c starts a series of processing steps which the selected display content signify. First, the utility 13c notifies the System BIOS 13a to check the state of the device attached into the select bay slot 7 (step S103).

Upon receiving the notification from the utility 13c, the System BIOS 13a reads the values of the registers 28a and 28b which are disposed in the EC/KBC 28. More specifically, the System BIOS 13a reads the "sort of the device attached into the select bay slot 7 (hereinbelow, termed "device sort information")" from the register 28a (step S104). Further, the System BIOS 13a reads the "power supply state of the device attached into the select bay slot 7 (hereinbelow, termed "device power-supply state information")", from the register 28b (step S105).

The System BIOS 13a notifies the utility 13c of the information items which have been respectively read from the registers 13a and 13b (step S106).

The utility 13c determines whether or not the power supply state of the ODD 7a attached into the select bay slot 7 is the power-supply OFF state, on the basis of the power-supply state information notified of by the System BIOS 13a (step S107).

In a case where the utility 13c has determined "that the power supply state of the ODD 7a attached into the select bay slot 7 is the power-supply OFF state" ("No" at the step S107), this utility 13c notifies the System BIOS 13a to shift the power supply state of the ODD 7a, into the "ON" state (step S108). On the other hand, in a case where the utility 13c has not determined "that the power supply state of the ODD 7a attached into the select bay slot 7 is the power-supply OFF state" ("Yes" at the step S107), the power supply state of the ODD 7a attached into the select bay slot 7 is the power-supply ON state, and hence, the routine proceeds to the processing of a step S113 to be stated later.

Upon receiving the notification of the step S106 from the utility 13c, the System BIOS 13a notifies the EC/KBC 28 to start the power supply to the ODD 7a.

On the basis of the notification from the System BIOS 13a, the EC/KBC 28 delivers a control signal so as to turn the switch 24c from the "OFF" state into the "ON" state, through the signal line 24b as described with reference to FIG. 3. Then, the power supply is started for the ODD 7a (step S109).

Further, the System BIOS 13a notified of the start of the power supply to the ODD 7a by the EC/KBC 28 determines the sort of the device attached into the slot 7. If the determined device is the ODD 7a, the System BIOS 13a shifts the IDE controller 20b within the I/O hub 20, from the disabled state into an enabled state (step S110).

Besides, the System BIOS 13a writes into the register 28b, a bit which signifies that the power source voltage is being supplied to the ODD 7a attached into the select bay slot 7 (step S111).

After having shifted the power supply state of the ODD 7a from the power-supply OFF state into the power-supply ON state, the System BIOS 13a notifies the OS 13b to the effect "that the power source voltage is being supplied to the ODD 7a". The OS 13b receives the notification, and recognizes that the ODD 7a attached into the select bay slot 7 is a usable device (step S112).

The utility 13c receives from the System BIOS 13a, a notification to the effect "that the power supply state of the ODD 7a is the power-supply ON state (usable state)". In a case where the user has selected the display "dis2" which signifies "that the power supply state of the ODD 7a is to be shifted from the power-supply OFF state into the power-supply ON state, and that the tray of the ODD 7a is to be thereafter opened", in the content displayed at the step S102 ("Yes" at the step S113), the utility 13c performs a control so as to open the tray of the ODD 7a, after having received from the System BIOS 13a the notification to the effect that the ODD 7a is in the usable state (step S114).

The above embodiments have been described on the control for restarting the power supply to any of the devices attachable into the select bay slot 7. However, such a control need not be restricted to the device attached into the select bay slot 7, but it may well be applied to any device fixed to the body 2.

The user manipulation for starting the process for bringing the state of the power supply to the device, from the power-supply OFF state into the power-supply ON state, as described with reference to FIG. 4, need not be restricted to the "manipulation of the specified key among the group of keys constituting the keyboard 5, either. The key manipulation may well be replaced with the "manipulation of depressing a button which is previously disposed in order to start a process for turning the state of the power supply to the device, from the "OFF" state into the "ON" state", the "manipulation of connecting the AC adaptor 31", or the "manipulation of moving the display unit 3 from the closed position to the open position".

Besides, the utility 13c, for example, may well be provided with a timer counter so as to execute the processing content of the step S103 in FIG. 4 in order that the timer counter may start counting since the state of the power supply to the device has shifted from the "ON" state into the "OFF" state, and that the state of the power supply to the device may be shifted from the power-supply OFF state into the power-supply ON state upon the lapse of a predetermined time period.

Besides, the computer 1, for example, may well be provided with a sensor in order that, when the sensor has detected a predetermined state, the utility 13c may execute the processing content of the step S103 in FIG. 4 so as to shift the state of the power supply to the device, from the power-supply OFF state into the power-supply ON state.

The present invention is not restricted to the foregoing embodiments as they are, but it can be embodied at the stage of performance by altering constituents within a scope not departing from the purport thereof. Besides, various aspects of performance can be formed by appropriately combining a plurality of constituents disclosed in the embodiments. By way of example, some constituents may well be omitted from all the constituents indicated in the embodiments. Further, constituents included in the different embodiments may well be appropriately combined.

What is claimed is:

1. A device state control method for use in an information processing apparatus that has a body with a slot, a device connectable to the slot, a controller configured to control a power supply from the information processing apparatus to the device, the device state control method comprising:
   detecting whether the device is connected to the slot;
   turning ON the power supply when the device is detected as being connected to the slot;
   turning OFF the power supply when the device is detected as being detached from the slot; and
   receiving a command signal to turn the power supply ON or OFF;
   wherein, upon receiving the command signal to turn OFF the power supply, sending a pseudo-signal indicating that the device is detached from the slot to the controller to turn off the power supply.

2. The device state control method according to claim 1, further comprising:
   bringing into a usable state, a bus controller which controls a bus connected with the device, after the power supply to the device has been started.

3. The device state control method according to claim 1, further comprising:
   opening a tray included in the device, after the power supply to the device has been started.

4. The device state control method according to claim 1, further comprising:
   displaying a content which signifies that the power supply state of the device is to be shifted from the power-supply OFF state into the power-supply ON state, the content is displayed before the determining and selected by an user.

5. An information processing apparatus comprising:
   a body;
   a slot disposed in the body so that a device is detachably connected to the slot;
   a detector configured to detect whether the device is connected to the slot;
   a controller configured to control a power supply from the information processing apparatus to the device, the controller turning ON the power supply when the device is connected to the slot, the controller turning OFF the power supply when the device is detached from the slot; and
   an interface to which a command signal to turn ON or OFF the power supply is input,
   wherein, when the command signal to turn OFF the power supply is input to the interface, the interface sends a pseudo signal indicating that the device is detached from the slot to the controller to turn off the power supply.

6. The information processing apparatus according to claim 5, further comprising:
a bus which is connected with the device;
a bus controller which controls the bus; and
a changing unit which brings into a usable state, the bus controller, after the power supply to the device has been started.

7. The information processing apparatus according to claim 5, wherein the device includes an openable tray; and
the information processing apparatus further comprises:
an opening unit which opens the tray, after the power supply to the device has been started.

8. The information processing apparatus according to claim 5, further comprising:
a display which displays content which signifies that the power supply state of the device is to be shifted from the power-supply OFF state into the power-supply ON state, the content is displayed before the determination and selected by an user.

9. An information processing apparatus comprising:
a body having a slot;
a device which is detachably connected to the body via the slot;
a detector configured to detect whether the device is connected to the slot, and to store the connected device type;
a controller configured to control a power supply from the information processing apparatus to the device, the controller turning ON the power supply when the device is connected to the slot, the controller turning OFF the power supply when the device is detached from the slot;
an instruction unit which instructs to shift the power supply state of the device from a power-supply OFF state into a power-supply ON state; and
an interface to which a command signal to turn ON or OFF the power supply is input,
wherein, when the command signal to turn OFF the power supply is input to the interface, the interface sends a pseudo signal indicating that the device is detached from the slot to the controller to turn off the power supply.

10. The information processing apparatus according to claim 9, further comprising:
a bus which is connected with the device;
a bus controller which controls the bus;
a sort determination unit which determines a sort of the device, after the power supply to the device has been started by the controller; and
a state changing unit which brings into a usable state, the bus controller which controls the bus connected with the device whose sort has been determined by the sort determination unit.

11. The information processing apparatus according to claim 10, wherein the device includes an openable tray; and
the information processing apparatus further comprises:
an opening unit which opens the tray, after the bus controller has been brought into the usable state.

12. The information processing apparatus according to claim 9, further comprising:
a display which displays content which signifies that the power supply state of the device is to be shifted from the power-supply OFF state into the power-supply ON state, the content is displayed before the instruction and selected by an user.

13. The device state control method according to claim 1, further comprising:
recognizing a type of the connected device by accessing a resistor in the device, the resistor storing an information indicating the type of the device.

14. The device state control method according to claim 1, further comprising:
recognizing a type of the connected device by reading a voltage value of a signal line, the signal line electrically connecting the information processing apparatus and the device.

15. The device state control method according to claim 1, further comprising:
recognizing a type of the connected device by accessing a resistor in the information processing apparatus, the resistor storing an information indicating the type of the device.

16. The information processing apparatus of claim 5, further comprising:
recognizing a type of the connected device by accessing a resistor in the device, the resistor storing an information indicating the type of the device.

17. The information processing apparatus of claim 5, further comprising:
recognizing a type of the connected device by reading a voltage value of a signal line, the signal line electrically connecting the information processing apparatus and the device.

18. The information processing apparatus of claim 5, further comprising:
recognizing a type of the connected device by accessing a resistor in the information processing apparatus, the resistor storing an information indicating the type of the device.

19. The information processing apparatus of claim 9, further comprising:
recognizing a type of the connected device by accessing a resistor in the device, the resistor storing an information indicating the type of the device.

20. The information processing apparatus of claim 9, further comprising:
recognizing a type of the connected device by reading a voltage value of a signal line, the signal line electrically connecting the information processing apparatus and the device.

21. The information processing apparatus of claim 9, further comprising:
recognizing a type of the connected device by accessing a resistor in the information processing apparatus, the resistor storing an information indicating the type of the device.

* * * * *